United States Patent
Bailey et al.

(10) Patent No.: US 12,553,799 B2
(45) Date of Patent: Feb. 17, 2026

(54) TIRE INSPECTION ASSEMBLY INCLUDING A SPINDLE AND A CLAMPING MECHANISM

(71) Applicant: AKRON SPECIAL MACHINERY, INC., Akron, OH (US)

(72) Inventors: Edward J. Bailey, Hudson, OH (US); Daniel Zaklanovich, Tallmadge, OH (US)

(73) Assignee: POLING GROUP, INC., Akron, OH (US)

( * ) Notice: Subject to any disclaimer, the term of this patent is extended or adjusted under 35 U.S.C. 154(b) by 277 days.

(21) Appl. No.: 18/462,533

(22) Filed: Sep. 7, 2023

(65) Prior Publication Data

US 2024/0085276 A1 Mar. 14, 2024

Related U.S. Application Data (60) Provisional application No. 63/404,625, filed on Sep. 8, 2022.

(51) Int. Cl.
*G01M 17/02* (2006.01)

(52) U.S. Cl.
CPC ................. *G01M 17/021* (2013.01)

(58) Field of Classification Search
None
See application file for complete search history.

(56) References Cited

U.S. PATENT DOCUMENTS

| | | | |
|---|---|---|---|
| 5,257,561 A | 11/1993 | Folta | |
| 5,992,227 A * | 11/1999 | Jellison | G01M 17/021 73/146 |
| 9,464,964 B2 * | 10/2016 | Miyazaki | G01M 17/021 |
| 9,541,194 B2 * | 1/2017 | Haruna | F15B 15/204 |
| 10,809,157 B2 * | 10/2020 | Lint | B60C 25/007 |
| 11,333,569 B2 * | 5/2022 | Lint | G01M 1/06 |
| 2017/0343453 A1 | 11/2017 | Farelli et al. | |

FOREIGN PATENT DOCUMENTS

| | | |
|---|---|---|
| JP | 2011075295 A | 4/2011 |
| JP | 5896727 B2 | 7/2013 |
| JP | 2016014437 A | 1/2016 |
| JP | 2016176540 A | 10/2016 |
| WO | 2013054466 A1 | 4/2013 |

OTHER PUBLICATIONS

Extended European Search Report of application EP 23194850.6; dated Feb. 8, 2024.

* cited by examiner

*Primary Examiner* — Peter J Macchiarolo
*Assistant Examiner* — Jermaine L Jenkins
(74) *Attorney, Agent, or Firm* — Renner, Kenner, Greive, Bobak, Taylor & Weber Co., LPA (57) ABSTRACT

A tire inspection assembly includes a spindle and a clamping mechanism. The tire inspection assembly generally functions to mount a tire and allow for the inflation thereof to perform a test on the mounted tire. The tire inspection apparatus generally offers more robust centering, higher stiffness versus loads, and greater elimination of variable clearances that can otherwise impede repeatability.

20 Claims, 9 Drawing Sheets

TIRE INSPECTION ASSEMBLY INCLUDING A SPINDLE AND A CLAMPING MECHANISM

CROSS REFERENCE TO RELATED APPLICATIONS

This application claims the benefit of U.S. provisional patent application Ser. No. 63/404,625, filed Sep. 8, 2022, which is incorporated by reference herein.

FIELD OF THE INVENTION

One or more embodiments of the present invention relate to a tire inspection assembly. One or more embodiments of the present invention relate to a spindle and a clamping mechanism. One or more embodiments of the present invention relate to a tire inspection assembly utilizing the spindle and the clamping mechanism.

BACKGROUND OF THE INVENTION

Manufactured tires generally undergo certain testing before being made available for sale to the public. One such test includes the use of a tire inspection chuck which generally functions to mount a tire and allow for the inflation thereof. This test generally serves the purpose of inspecting tire balance, and possibly geometry.

One prior device, shown in U.S. Pat. No. 5,257,561, includes a tire holding fixture within a tire processing machine, the tire holding fixture including quick release locking means. The fixture includes a first wheel half support assembly and a second wheel half support assembly, each including components of the locking means for facilitating locking and alignment of the assemblies to form a simulated wheel.

However, there remains a need in the art for an improved tire inspection apparatus. More particularly, there remains a need in the art for an improved spindle and clamping mechanism. Even more particularly, there remains a need in the art for a tire inspection apparatus that offers more robust centering, higher stiffness versus loads, and elimination of variable clearances that can impede repeatability.

SUMMARY OF THE INVENTION

An embodiment of the present invention provides a tire inspection assembly having a locked position and an unlocked position, the tire inspection assembly comprising a chuck assembly with an upper locking assembly and a lower locking assembly; an upper tooling assembly including a locking shaft with a shaft portion including a plurality of receptive grooves, a portion of the shaft portion being positioned in the chuck assembly in the locked position, where the plurality of receptive grooves are shaped as gothic arches; a first plurality of locking balls positioned between the upper locking assembly and a respective one of the plurality of receptive grooves, such that when in the locked position, the first plurality of locking balls have two points of contact with the respective one of the plurality of receptive grooves and one point of contact with the upper locking assembly; a second plurality of locking balls positioned between the lower locking assembly and another respective one of the plurality of receptive grooves, such that when in the locked position, the second plurality of locking balls have two points of contact with the another respective one of the plurality of receptive grooves and one point of contact with the lower locking assembly.

Another embodiment of the present invention provides a tire inspection assembly having a locked position and an unlocked position, the tire inspection assembly comprising a chuck assembly with an upper locking assembly and a lower locking assembly, the upper locking assembly being made up of a first plurality of segments, the lower locking assembly being made up of a second plurality of segments; an upper tooling assembly including a locking shaft with a shaft portion, a portion of the shaft portion being positioned in the chuck assembly in the locked position.

A further embodiment of the present invention provides a tire inspection assembly having a locked position and an unlocked position, the tire inspection assembly comprising a chuck assembly for locking an upper tooling assembly into the locked position; a spindle assembly for housing and rotating a rotating shaft; and a rotary coupling positioned between the chuck assembly and the spindle assembly.

A still further embodiment of the present invention provides a tire inspection assembly having a locked position and an unlocked position, the tire inspection assembly comprising a chuck assembly with an upper locking assembly and a lower locking assembly; the upper locking assembly being made up of a first plurality of segments, the lower locking assembly being made up of a second plurality of segments; a lower tooling assembly including a locking shaft with a shaft portion including a plurality of receptive grooves, a portion of the shaft portion being positioned in the chuck assembly in the locked position, where the plurality of receptive grooves are shaped as gothic arches; a first plurality of locking balls positioned between the upper locking assembly and a respective one of the plurality of receptive grooves, such that when in the locked position, the first plurality of locking balls have two points of contact with the respective one of the plurality of receptive grooves and one point of contact with the upper locking assembly; a second plurality of locking balls positioned between the lower locking assembly and another respective one of the plurality of receptive grooves, such that when in the locked position, the second plurality of locking balls have two points of contact with the another respective one of the plurality of receptive grooves and one point of contact with lower locking assembly; a spindle assembly for housing and rotating a rotating shaft; and a rotary coupling positioned between the chuck assembly and the spindle assembly.

BRIEF DESCRIPTION OF THE DRAWINGS

Advantages of the present invention will become better understood with regard to the following description, appended claims, and accompanying drawings wherein:

DETAILED DESCRIPTION OF THE INVENTION

One or more embodiments of the present invention relate to a tire inspection assembly. One or more embodiments of the present invention relate to a spindle and a clamping mechanism. One or more embodiments of the present invention relate to a tire inspection assembly utilizing the spindle and the clamping mechanism. The tire inspection assembly, which may be referred to as a tire inspection apparatus, a tire testing assembly, or a tire testing apparatus, generally functions to mount a tire and allow for the inflation thereof. In this way, one or more tests can be performed on the mounted tire. Exemplary tests include inspecting tire balance and inspecting tire geometry. Advantageously, the tire inspection apparatus, especially via the spindle and the clamping mechanism thereof, generally offers more robust centering, higher stiffness versus loads, and greater elimination of variable clearances that can otherwise impede repeatability.

With reference to the Figures, a tire inspection apparatus 10, which may be referred to as a tire inspection assembly 10, a tire testing assembly 10, or a tire testing apparatus 10, is shown. Tire inspection apparatus 10 includes a motor 12, a spindle assembly 14, a chuck assembly 16, and an upper tooling assembly 18. Upper tooling assembly 18 includes an upper rim 20 and a locking shaft 22. A lower rim 24 is generally positioned between chuck assembly 16 and upper tooling assembly 18.

While the various specific details of these components will be further described herein below, a general overview thereof is provided here. Motor 12 is the bottommost component and drives a rotating shaft 26 of spindle assembly 14. It should be appreciated that the term bottommost and other positional terms utilized herein are relative to the configuration shown in FIG. 1, though other relative positions of tire inspection apparatus 10 may be utilized. Rotating shaft 26 of spindle assembly 14 extends upward from motor 12, through an outer spindle portion 28 of spindle assembly 14, and up to chuck assembly 16. Chuck assembly 16 generally serves to lock upper tooling assembly 18 in relative position with the lower tooling (e.g., lower rim 24), which locked position may also be referred to as the measurement position. When in the measurement position, a tire (not shown) positioned between upper rim 20 and lower rim 24 can then be rotated and tested.

As mentioned above, motor 12 drives rotating shaft 26 of spindle assembly 14, which may be referred to as precision rotating assembly 14. The rotation of shaft 26 by motor 12 serves to rotate a tire (not shown) for testing. As an example, the rotation of the tire to be tested can be used to detect a variation in the load effected on one or more load cells (not shown). Motor 12 is particularly coupled to an attachment location 30 of shaft 26, which attachment location 30 includes a bottom portion and distal end of shaft 26 being positioned within an inner portion of motor 12. The motor 12 is aligned and fastened to the shaft 26 such that the motor 12 has no internal bearings and instead relies on spindle bearings 38. This provision minimizes misalignment and vibrations that would be otherwise inherent to the use of multiple bearings acting on the shaft. Other details of motor 12 (e.g., speed and power) and tests for tires will be generally known to the skilled person.

In a position above motor 12, spindle assembly 14 includes an inflation air entry 32. Inflation air entry 32 leads to a first rotary coupling 34, which may also be referred to as an inflation coupling 34. First rotary coupling 34 may be said to be integrated with outer spindle portion 28 based on first rotary coupling 34 being coupled with outer spindle portion 28 by stationary elastomeric seals 35. This inner portion of the rotary coupling 34 being coupled to the rotating shaft 26 via elastomeric seals 35 allows for rotation of shaft 26. Since first rotary coupling 34 is integrated with spindle assembly 14, first rotary coupling 34 is stationary within the spindle assembly 14 when motor 12 rotates shaft 26.

First rotary coupling 34 with second rotary coupling 36 generally serve to deliver a pneumatic pressure (i.e., air) to various functions of chuck assembly 16 via the rotating spindle assembly 14. First rotary coupling 34 is more particularly utilized as a coupling between the air entry 32 and spindle assembly 14 for the application of a high volume of air pressure to inflate a mounted test tire.

By providing first rotary coupling 34 at the position within spindle assembly 14 and at the lower portion thereof, certain advantages are realized relative to performance, service, and disassembly. The elimination of bearings other than the primary spindle bearings 38 provides one or more advantages over conventional couplings, which can often include bearings which can contribute to unwanted vibrations. The motor 12 can be removed relatively easily, and then first rotary coupling 34 can be accessed.

As suggested above, outer spindle portion 28 of spindle assembly 14 houses first rotary coupling 34 and a portion of rotating shaft 26. Outer spindle portion 28 may therefore be referred to as a spindle housing 28. First rotary coupling 34 is located within outer spindle portion 28 by utilizing O-rings 37 therebetween, which provides a snug fit to prevent rotation of first rotary coupling 34. As mentioned above, the shaft 26 rotates within the elastomeric seals 35, which may also be referred to as inner low friction seals 35, of first rotary coupling 34.

Figure 1:
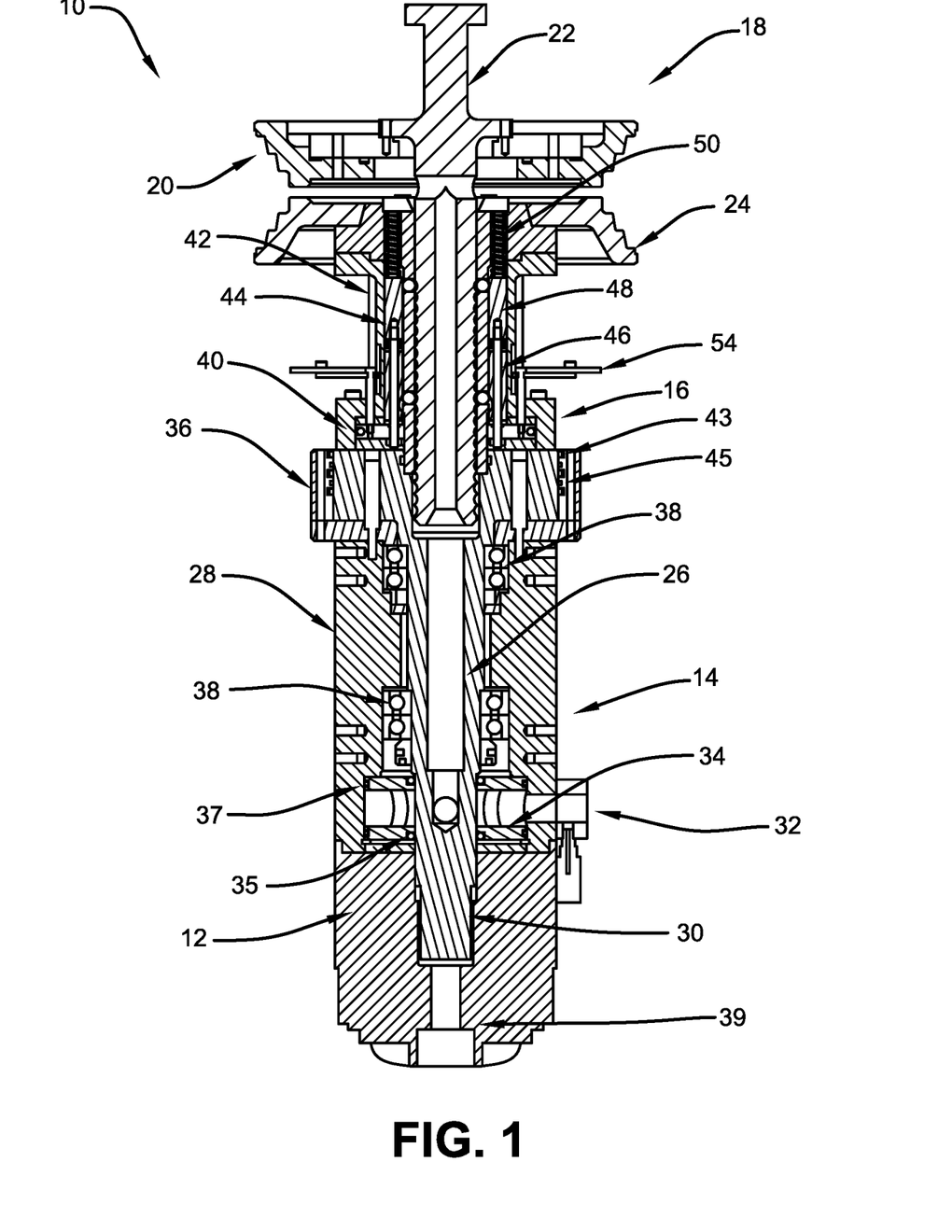
FIG. 1 is a front, sectional view of a tire inspection assembly, shown in a locked position.

As mentioned above, one or more ball bearings 38 can be positioned between outer spindle portion 28 and shaft 26. For example, FIG. 1 shows two upper ball bearings 38 and two lower ball bearings 38. Such ball bearings are generally known to the skilled person and can include an inner race, a plurality of balls, and an outer race.

Spindle assembly 14 further includes a feedback device 39 within motor 12. The feedback device 39 generally serves to provide the angular position and velocity of the shaft 26 to corresponding equipment, providing for motor 12 speed control and measurement of the imbalance angle. An exemplary feedback device 39 is an encoder.

Figure 2:
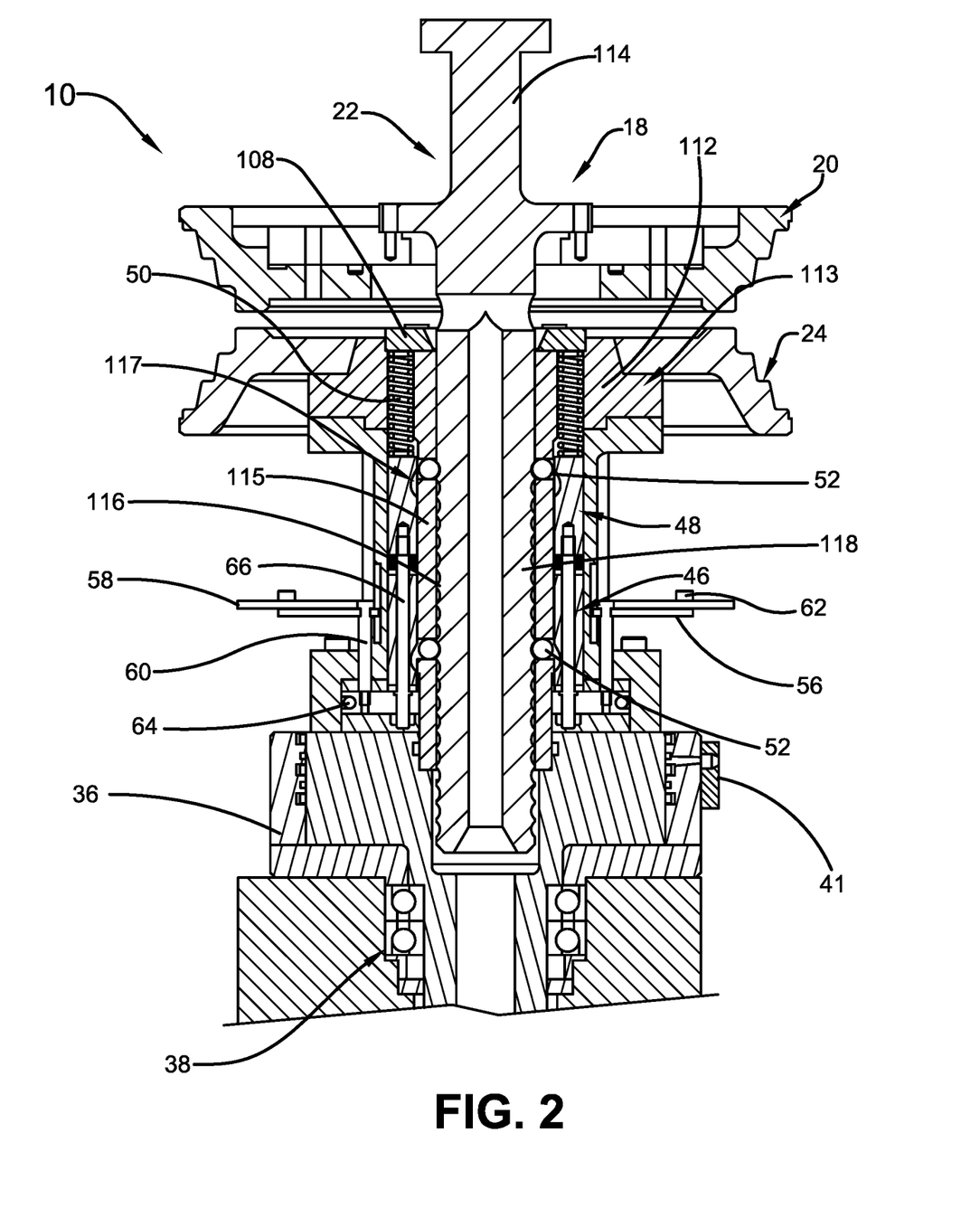
FIG. 2 is a front, sectional view of a portion of the tire inspection assembly, shown in the locked position.

Second rotary coupling 36 is positioned above, and is fixed relative to, outer spindle portion 28. Second rotary coupling 36, which may also be referred to as an unlock coupling 36, generally serves to apply a pneumatic signal (i.e., air) to actuate a piston assembly 40 and unlock upper tooling assembly 18, as will be further described herein. Second rotary coupling 36 includes an air entry manifold 41 (FIG. 2). In this way, second rotary coupling 36 can provide pneumatic signal (i.e., air) to actuate piston assembly 40.

Figure 10:
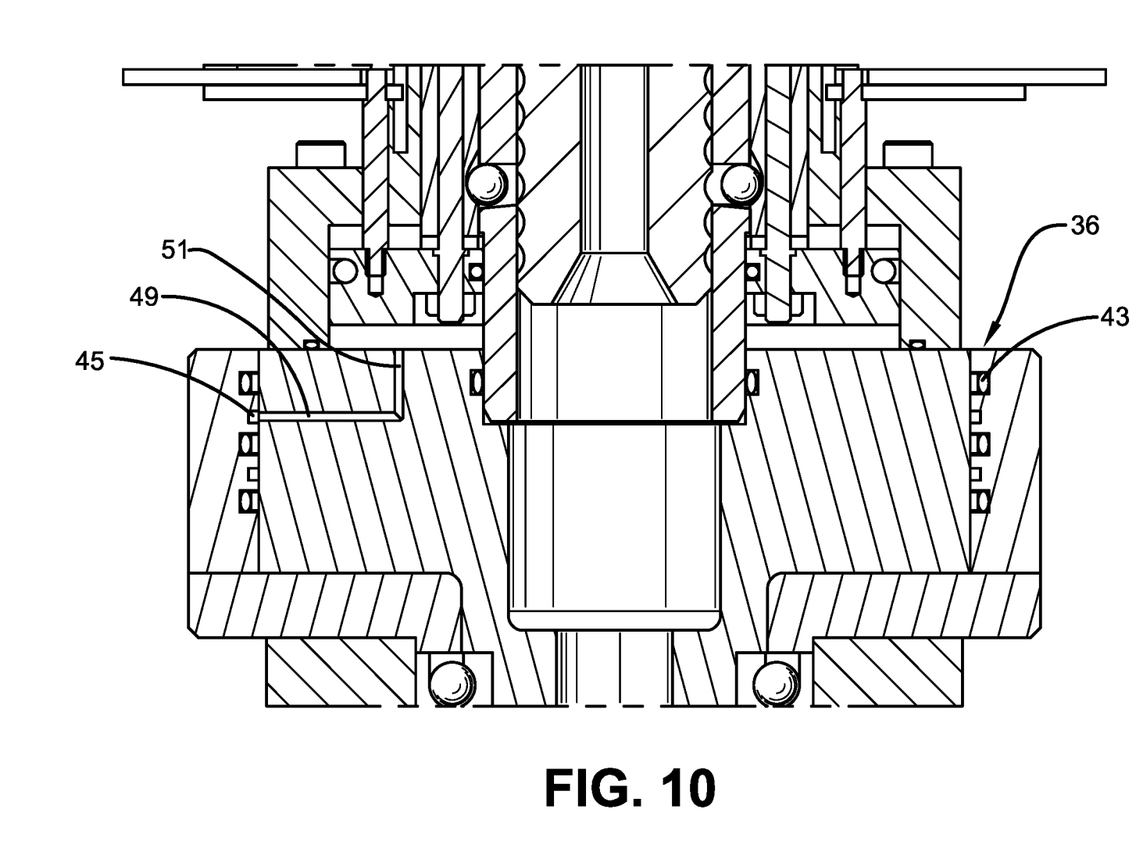
FIG. 10 is a front, sectional closer view of a coupling and other components of the tire inspection assembly.

With reference to FIG. 10, second rotary coupling 36 is attached to the outer spindle portion 28 and contains multiple sealing elements 43 (FIG. 10) which are stationary within the coupling 36 and provide a pneumatic seal relative to the rotating shaft 26. Between the sealing elements 43 are grooves 45 which transmit the air pressure into shaft 26 via one or more radial passages 49 in the shaft 26. Radial passages 49 intersect axial holes 51 in the shaft 26 which allows the air pressure to act on the piston assembly 40. As with the first rotary coupling 34, second rotary coupling 36 includes elimination of bearings other than the primary spindle bearings 38, which again leads to elimination or reduction in unwanted vibrations. Said another way, all functions share the main spindle bearings 38. And by providing second rotary coupling 36 at the position above outer spindle portion 28 and external thereto, certain advantages are realized relative to performance, service, and disassembly. Second rotary coupling 36 can be secured with outer spindle portion 28 via multiple vertical fasteners (e.g., screws) through second rotary coupling 36 and into outer spindle portion 28.

As suggested above, chuck assembly 16 is generally positioned between outer spindle portion 28 and lower rim 24. Chuck assembly 16, which may be referred to as a precision clamping mechanism 16, generally serves as the mechanism for locking upper tooling assembly 18 into a measurement position relative to the lower tooling (e.g., lower rim 24), and also assists with rotating the tire and assembly via the spindle assembly 14. As will be further described herein, components of the chuck assembly 16 have a first position (e.g., FIG. 2, FIG. 3), which may be referred to as a locked position, and a second position (e.g., FIG. 4, FIG. 5), which may be referred to as an unlocked position.

Chuck assembly 16 includes an outer chuck portion 42 which generally houses a chuck locking assembly 44. Outer chuck portion 42 may therefore be referred to as a chuck housing 42. The lower area of the outer chuck portion 42 may also be referred to as a chuck cylinder 42. Chuck locking assembly 44 generally includes piston assembly 40, a lower locking assembly 46, an upper locking assembly 48, and a plurality of springs 50. As will be further described herein below, chuck locking assembly 44 works in conjunction with upper tooling assembly 18 and a plurality of locking balls 52.

A lock position ring 54 is positioned external of outer chuck portion 42. Lock position ring 54 includes lower supports 56 and an upper cylindrical ring 58 (FIG. 2) which are driven by piston assembly 40 via rods 60. While lower supports 56 and upper cylindrical ring 58 are shown as separate components in the Figures, which might be done for ease of manufacture and assembly, in other embodiments, lower supports 56 and upper cylindrical ring 58 can be a unitary component. Lower supports 56 can be secured with the rods 60 of piston assembly 40. Upper cylindrical ring 58 can be secured to lower supports 56 with one or more fasteners 62.

The position lock position ring 54 can be detected by a proximity sensor (not shown) to ensure proper sequencing of the operation of tire inspection apparatus 10. Since lock position ring 54 moves up and down with piston assembly 40, this movement can be utilized for the purpose of indicating whether chuck assembly 16 and tire inspection apparatus 10 are in the locked position or the unlocked position. As will be further described herein below, if lock position ring 54 is in an upper position, this generally indicates chuck assembly 16 and tire inspection apparatus 10 are in the unlocked position, and if lock position ring 54 is in a lower position, this generally indicates chuck assembly 16 and tire inspection apparatus 10 are in the locked position.

As best seen in FIGS. 2 to 5, piston assembly 40 includes a variety of components that move up and down in order to move chuck assembly 16 and tire inspection apparatus between the locked position or the unlocked position. Piston assembly 40 includes a base 64 which is secured to rods 60 and rods 66. As mentioned above, rods 60 serve to attach upper cylindrical ring 58 via lower cylindrical ring 56. Rods 60 transmit the position of the piston assembly 40.

Rods 60, which may be referred to as proximity rods 60, are secured with lower cylindrical ring 56 and lock position ring 54 to effect movement thereof. As perhaps best seen in FIG. 5, each end 60A of rod 60 can be a smaller diameter than a body portion 60B of rod 60, in order to provide the respective securements. As shown in the Figures, a portion of rods 60 can be positioned outside of chuck housing 42.

Rods 66 are the tension and load bearing rods. Rods 66, which may be referred to as tension rods 66, extend through bores 68 (FIG. 5 and FIG. 7) through lower locking assembly 46. Bores 68 may also be referred to as clearance holes 68. Rods 66 extend upward to and are secured with upper locking assembly 48. More specifically, a respective end of rod 66 is secured within a respective hole 70 (FIG. 5) of upper locking assembly 48. As perhaps best seen in FIG. 5, each end 66A of rod 66 can be a smaller diameter than a body portion 66B of rod 66, in order to provide the respective securements. With rods 66 being secured with upper locking assembly 48, movement of piston assembly 40 also causes movement of upper locking assembly 48.

Figure 6:
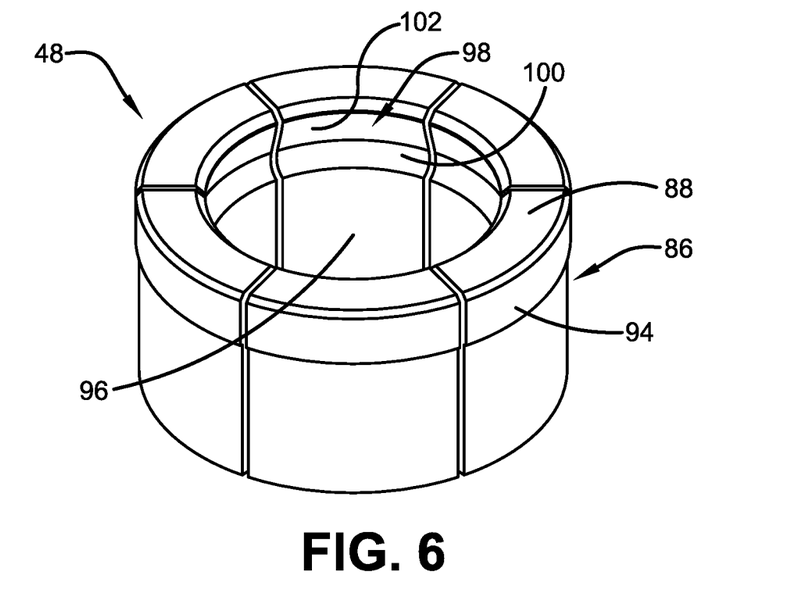
FIG. 6 is a perspective view of an upper locking segment assembly of the tire inspection assembly.

As further description of upper locking assembly 48, reference is made to FIG. 6. Upper locking assembly 48 is a generally cylindrical sleeve divided into multiple segments 86, which are principal in applying a locking or clamping force to a first plurality of locking balls 52. By dividing upper locking assembly 48 into segments 86, the segments 86 should provide sufficient 'give' for the movement between the locked position and the unlocked position. In this way, the radial clearance can be eliminated. Said another way, due to the segmentation of upper locking assembly 48, the segments 86 expand radially when loaded and eliminate radial clearance relative to the inner surface of outer chuck portion 42. And by dividing upper locking assembly 48 into segments 86, the segments 86 provide a radial clamping force to the first plurality of locking balls 52. In this way, the clamping force may be described as dual-action clamping based on also including the vertical clamping force transmitted via the springs 50. The springs 50 acting on the upper locking assembly 48 provide for initial clamping forces. The inflation pressure acts on the piston 40 and pulls the upper locking assembly 48 down via the rods 66.

As comment on an advantage of providing upper locking assembly 48 as segments 86, unsegmented locking sleeve elements in certain conventional machines require a radial clearance for sliding. This conventional radial clearance allows for misalignment which can negatively impact repeatability performance.

Each segment 86 includes a body 88. Body 88 includes hole 70 (FIG. 5) at one end for fastening tension rods 66. At the other end, body 88 is positioned against an end of the springs 50. External of body 88 is an outer surface 94 which includes a wider diameter, which may be referred to as a precision centering surface 94. Precision centering surface 94 should be designed to achieve the precise movements of tire inspection apparatus 10.

Internal of body 88 is an inner surface 96, which includes a groove 98 for locking balls 52. Groove 98 includes an unlock pocket 100 where the locking balls 52 rest in the unlocked position. Groove 98 further includes a tapered locking surface 102, which may also be referred to as a wedge 102, against which the locking balls 52 are pressed in the locked position.

Though FIG. 6 shows upper locking assembly 48 with six segments 86, in other embodiments, other numbers of segments 86 may be suitable. Other exemplary numbers of segments 86 include three or more, four or more, or still more in other embodiments. These numbers, and other specific numbers disclosed elsewhere herein, may be utilized to form suitable ranges, such as from three to six segments 86. In one or more embodiments, the number of segments 86 is the same as the number of segments 72.

Figure 3:
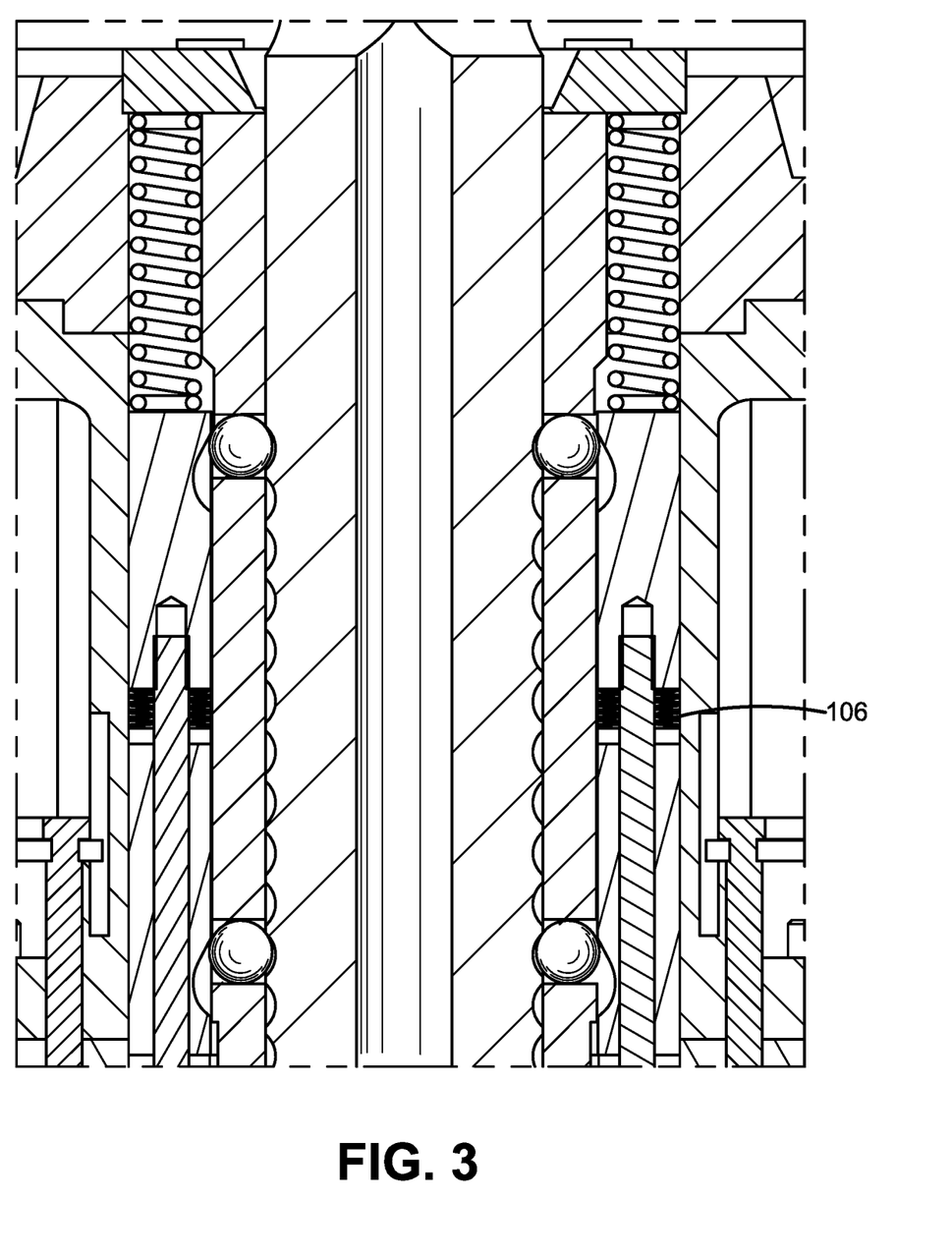
FIG. 3 is a front, sectional, closer view of a locking mechanism of the tire inspection assembly, shown in the locked position.
Figure 7:
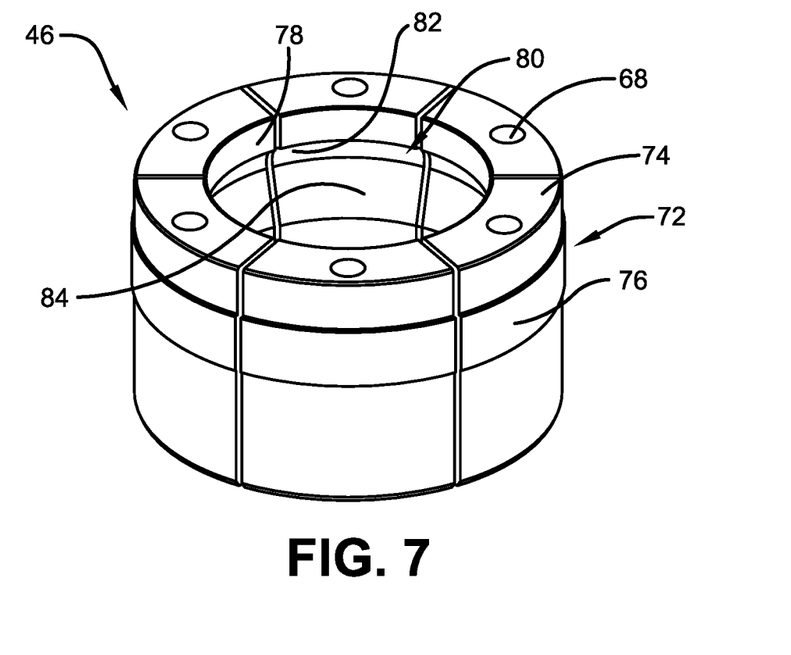
FIG. 7 is a perspective view of a lower locking segment assembly of the tire inspection assembly.

As further description of lower locking assembly 46, reference is made to FIG. 7. It should be appreciated that FIG. 7 shows the inverted position of lower locking assembly 46 relative to the use position (e.g., FIG. 1) in order to better show the components thereof. The lower locking assembly 46 is a generally cylindrical sleeve divided into multiple segments 72, in a manner essentially identical to the upper locking assembly 48, which are principal in applying a locking or clamping force to a second plurality of locking balls 52. By dividing lower locking assembly 46 into segments 72, the segments 72 provide sufficient radial expansion for the movement between the locked position and the unlocked position. In this way, the radial clearance can be eliminated in the same manner as for the upper locking assembly 48. The clamping force may be described as dual-action clamping based on also including the vertical clamping force transmitted via the spring force of intermediate springs 106 (FIG. 3).

Each segment 72 includes a body 74 with bore 68 therethrough. External of body 74 is an outer surface 76, which includes a wider diameter, which may be referred to as a precision centering surface 76. Precision centering surface 76 should be designed as to achieve the precise movements of tire inspection apparatus 10.

Internal of body 74 is an inner surface 78, which includes a groove 80 for locking balls 52. Groove 80 includes an unlock pocket 82 where the locking balls 52 rest in the unlocked position. Groove 80 further includes a tapered locking surface 84, which may also be referred to as a wedge 84, against which the locking balls 52 are pressed in the locked position.

Though FIG. 7 shows lower locking assembly 46 with six segments 72, in other embodiments, other numbers of segments 72 may be suitable. Other exemplary numbers of segments 72 include three or more, four or more, or still more in other embodiments. These numbers can be used to form suitable ranges, such as from three to six segments 72.

As mentioned above, a plurality of spring elements 50 (FIG. 4) act on upper locking assembly 48. In the locked position (FIG. 2 and FIG. 3), the spring force of springs 50 is allowed to act on upper locking assembly 48 to thereby move piston assembly 40 to the locked position.

In the unlocked position (FIG. 4 and FIG. 5), the spring force of springs 50 is sufficiently overcome by actuating piston assembly 40. This actuation of piston assembly 40 thereby compresses springs 50 to the unlocked position.

Tire inspection apparatus 10 can include a number of springs 50 corresponding to the number of segments 72 and segments 86, and the corresponding numbers from above are also incorporated here relative to springs 50.

The spring force from springs 50 works in conjunction with the intermediate springs 106 (FIG. 3). Intermediate springs 106 are positioned around a respective end of the rods 66. Similar to springs 50, in the locked position, the spring force of intermediate springs 106 is allowed to act on lower locking assembly 46, transmitting the forces and motion of the upper locking assembly 48 to the lower locking assembly 46. The springs 106 provide an elastic connection between the upper locking assembly 48 and lower locking assembly 46 in order to accommodate any dimensional variations in the overall locking mechanism. In the unlocked position, the spring force of intermediate springs 106 is sufficient to allow the piston assembly 40 to move both lower 46 and upper locking 44 assemblies in unison.

Tire inspection apparatus 10 can include a number of intermediate springs 106 corresponding to the number of springs 50, segments 72, and segments 86, and the corresponding numbers from above are also incorporated here relative to springs 106.

Springs 50 are secured in place by a retaining plate 108. One or more fasteners (not shown) are used to secure retaining plate 108 with springs elements 50, which thereby provides sufficient reaction force for securing all the below positioned components in place.

Retaining plate 108 and springs 50 are positioned generally within a rim mounting provision 112 of a locking sleeve 113. Retaining plate 108 can be secured to rim mounting provision 112 of locking sleeve 113 with one or more fasteners (not shown).

Rim mounting provision 112 of locking sleeve 113 is shaped to receive an internal portion of lower rim 24 as to sufficiently and accurately secure lower rim 24 thereto. Lower rim 24 can be secured to rim mounting provision 112 of locking sleeve 113 with one or more fasteners (not shown).

Lower rim 24 is sized in conjunction with upper rim 20 to provide the required tooling specific to mounting the tire. Lower rim 24 and upper rim 20 emulate the wheel on which the tire will be mounted for vehicle use. Lower rim 24 and upper rim 20 as shown are typically designed to accommodate multiple tire sizes.

Figure 4:
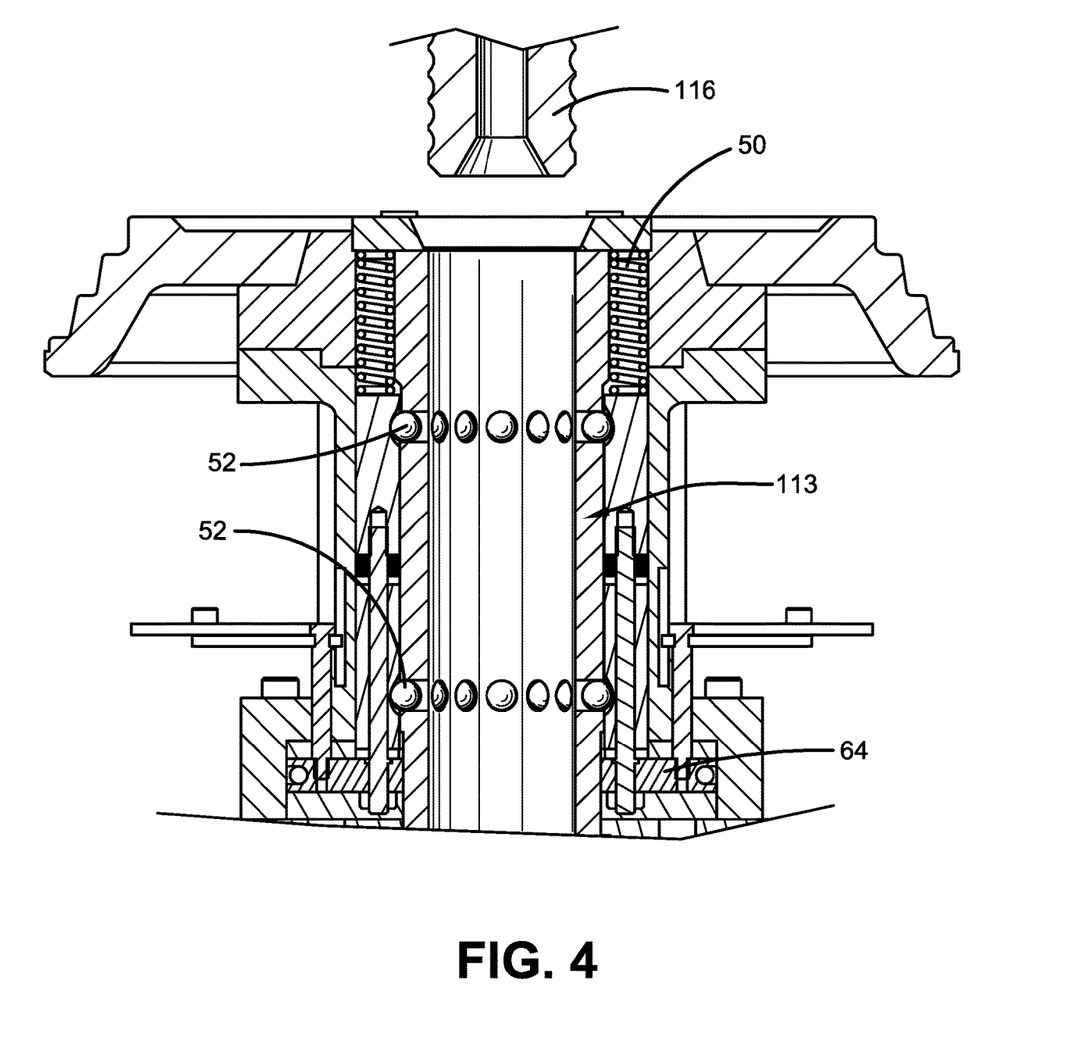
FIG. 4 is a front, sectional view of a portion of the tire inspection assembly, shown in an unlocked position.

As mentioned above, upper rim 20 is part of upper tooling assembly 18, which also includes locking shaft 22. Locking shaft 22 includes a handle portion 114 with a shaft portion 116 extending therefrom. In the unlocked position, shaft portion 116 can be positioned as desired, including movement outside of chuck assembly 16 for the primary purposes of inserting or removing a tire, as shown in FIG. 4. In the locked position, shaft portion 116 is positioned inside of chuck assembly 16 to allow for clamping at a specific width required for the tire inflation and subsequent inspection, as shown in FIG. 2 and FIG. 3.

Shaft portion 116 of locking shaft 22 works in conjunction with locking sleeve 113, particularly a sleeve portion 115 (FIG. 2) thereof. Sleeve portion 115 includes a variety of through holes 117 through which the locking balls 52 move between the locked position and the unlocked position. Said another way, through holes 117 of sleeve portion 115 may be said to house the locking balls 52.

Shaft portion 116, which may also be referred to as locking portion 116, has an outer surface formed with a plurality of receptive grooves 118 for receiving locking balls 52. Receptive grooves 118, which may also be referred to as grooves 118 or gothic arch grooves 118, can span a portion, a majority, or the entirety of the outer surface of shaft portion 116. A sufficient number of receptive grooves 118 should be in the outer surface of shaft portion 116 as to allow for different sized tires to be used with tire inspection apparatus 10. That is, by having a sufficient number of receptive grooves 118, the locking balls 52 can insert into different ones of receptive grooves 118 for different sized tires. In this way, lower rim 24 and upper rim 20 can be at different positions for a locked position, which may also be referred to as adjusting the applied bead width of the tooling.

Figure 9:
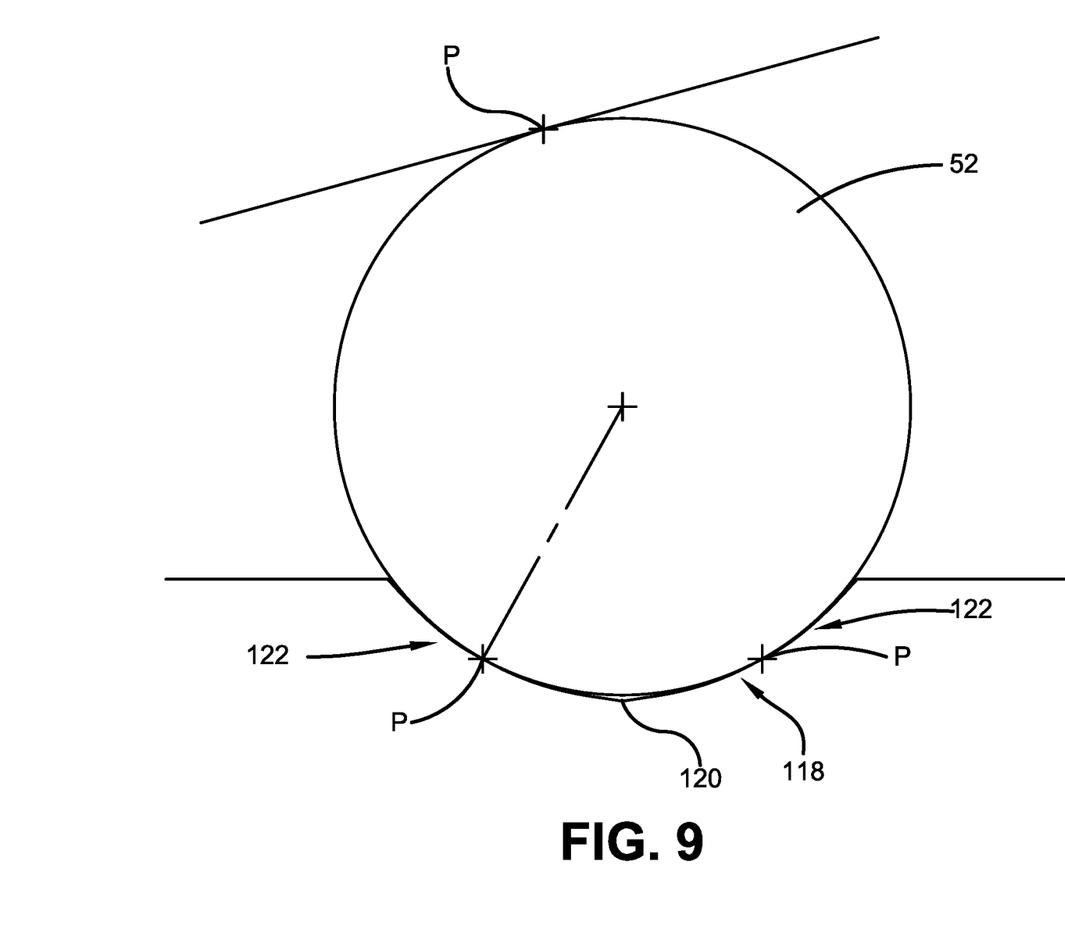
FIG. 9 is a schematic of a gothic arch groove profile, showing a locking ball positioned in a gothic arch groove.

As suggested above, grooves 118 may be preferably shaped as a gothic arch. With reference to FIG. 9, a gothic arch, which may be referred to as a pointed arch, is an arch with a pointed crown 120 and two curving sides 122, which may also be referred to as arcing segments 122. The two arcing segments 122 meet at a relatively sharp angle at the pointed crown 120, which may also be referred to as the top 120 of the arch. This may also be referred to as the grooves 118 having offsetting radii relative to locking balls 52.

As best seen in FIG. 9, the gothic arch shape for grooves 118 provides three points of contact P for locking ball 52 within groove 118 in the locked position. At each point of the lowest radii relative to groove 118, locking ball 52 is in contact with groove 118, thereby providing two points of contact P within groove 118. When in the locking position, with clamping force applied, as will be further described herein below, a third point of contact P exists between locking ball 52 and tapered locking surface 84 or tapered locking surface 102.

This configuration with three points of contact P generally serves to provide improved dimensional stability and rigidity. Moreover, this configuration with three points of contact P generally serves to provide improved precision and repeatability, which can be important for the measurement performance.

In one or more embodiments, all of the grooves 118 are in the shape of a gothic arch. In one or more embodiments, all of the grooves 118 are not the shape of a circular arc.

With further reference to locking balls 52, the plurality of locking balls 52 can include any suitable number as to sufficiently lock tire inspection apparatus 10 in the locked position. As mentioned above, the plurality of locking balls 52 can include a first plurality of upper locking balls 52 and a second plurality of lower locking balls 52.

In one or more embodiments, the first plurality of upper locking balls 52 includes from six to twelve locking balls 52. In one or more embodiments, each segment 86 includes one or more locking balls 52, in other embodiments, each segment 86 includes two or more locking balls 52, in other embodiments, each segment 86 includes from one to three locking balls 52.

In one or more embodiments, the second plurality of lower locking balls 52 includes from six to twelve locking balls 52. In one or more embodiments, each segment 72 includes one or more locking balls 52, in other embodiments, each segment 72 includes two or more locking balls 52, in other embodiments, each segment 72 includes from one to three locking balls 52.

Figure 5:
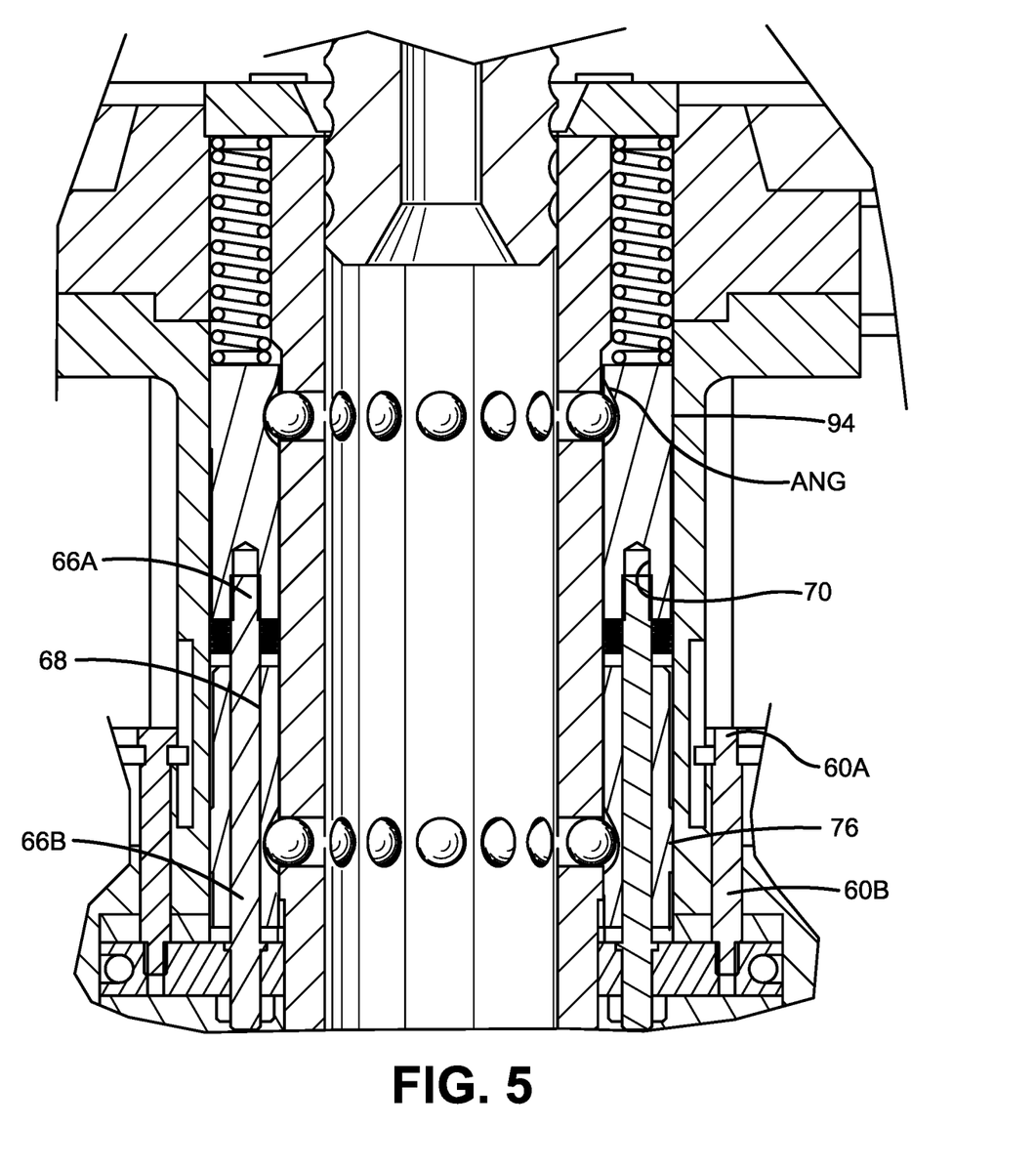
FIG. 5 is a front, sectional, closer view of the locking mechanism of the tire inspection assembly, shown in the unlocked position.

With reference to FIG. 5, the surface against which locking balls 52 are clamped in the locking position may be characterized by the angle ANG of the surface. These surfaces include tapered locking surface 84 and tapered locking surface 102. In one or more embodiments, the angle ANG may be from 10° to 20°, in other embodiments, the angle ANG can be about 10°, and in other embodiments, about 20°. The angle ANG can depend on optimization of the clamping forces. The angles given here are with reference to the vertical axis.

The operation and sequencing steps of tire inspection apparatus 10 will now be further described. To place apparatus 10 in the unlocked position, the piston assembly 40 is actuated upward by a pneumatic signal supplied through the rotary coupling 36 and transmitted through the spindle shaft 26. In this unlocked position, the piston forces from piston assembly 40 are sufficient to overcome the spring forces of spring assemblies 50 and intermediate springs 106. The lower locking assembly 46 and upper locking assembly 48 move upward in unison and the locking balls 52 are allowed to drop into and to move into unlock pockets 82, 100. Starting from the unlocked position (FIG. 4 and FIG. 5), upper tooling assembly 18 is removed from chuck assembly 16 such that upper rim 20 is not positioned proximate to lower rim 24.

Relative to the tire to be tested (not shown), upper rim 20 and lower rim 24 should be designed as to receive the tire, which tire will include a predetermined bead width. One side of the tire will be first positioned on lower rim 24. Shaft portion 116 of locking shaft 22 should then be inserted through the inner diameter of the tire to thereby enter chuck assembly 16. This movement generally continues until upper rim 20 comes into contact with the other side of the tire and at the preset bead width as to sandwich the tire between upper rim 20 and lower rim 24.

Once shaft portion 116 and locking shaft 22 are in the desired position, action is taken to remove the piston forces (i.e., pneumatics) from piston assembly 40 such that the spring forces of spring assemblies 50 and intermediate springs 106 will be allowed to compress piston assembly 40 downward. Once the spring forces of spring assemblies 50 and intermediate springs 106 are sufficient relative to forces from piston assembly 40, the spring forces cause locking balls 52 to be locked within grooves 80, 98, specifically against tapered locking surfaces 84, 102. Said another way, spring assemblies 50 and intermediate springs 106 drive locking balls 52 into the locked position based on the angular surfaces of tapered locking surfaces 84, 102 being driven against locking balls 52. As mentioned above relative to FIG. 9, this locked position of locking balls 52 includes three points of high force contact. Moreover, as the force is applied to the locking balls 52, segments 72, 86 are also driven outward radially.

Once the tire is mounted at the predetermined bead width, and chuck assembly 16 is clamped in the locked position, the tire is inflated to a test pressure. As suggested above, this occurs via inflation air entry 32 providing air to rotating shaft 26 and upper tooling assembly 18, to thereby provide air to the tire. The inflation pressure acts on the piston assembly 40 providing significant forces in addition to that provided by the springs 50 and intermediate springs 106. This additional clamping force is necessary due to the high forces within the tire and rim assemblies due to the inflation pressures. Therefore, the two stage clamping provides for improved stiffness and minimized deflections within tire inspection apparatus 10, which offers advantages relative to measurement quality.

Figure 8:
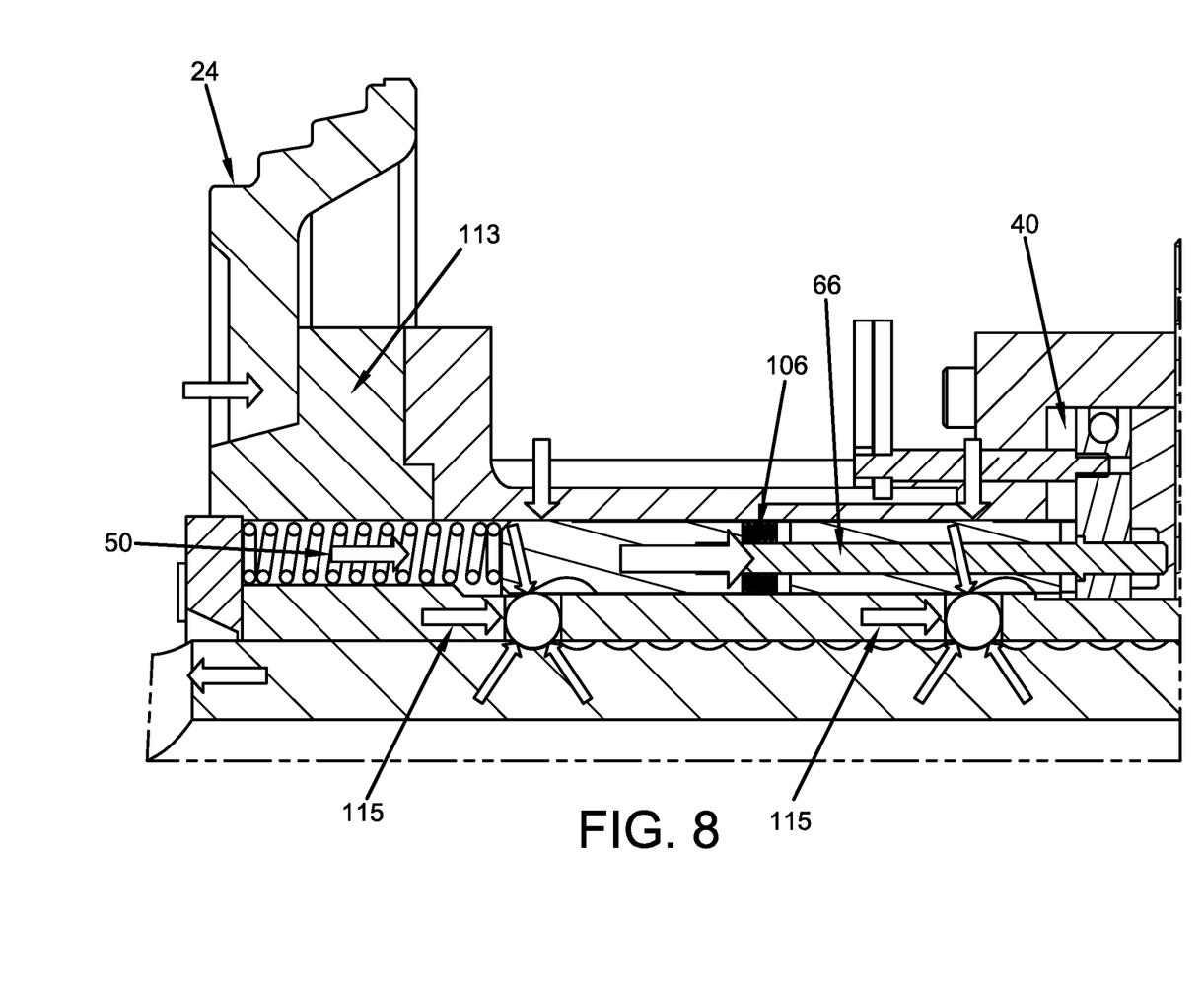
FIG. 8 is a front, sectional view of a portion of the tire inspection assembly, shown in an unlocked position, and showing a summary of corresponding forces.

The balls 52 are locked radially between grooves 80, 98, specifically against tapered locking surfaces 84, 102, with high force. The reaction forces due to the inflation separating forces are accepted and resisted by an upper flat or orthogonal portion of through holes 117. Through holes 117, which may also be referred to as ball sockets 117, are within the sleeve portion 115 of locking shaft 22. A tapered lower portion of through holes 117 assists the balls 52 with falling into pockets 82 and 100 during the unlocking thereof. In view of this overall configuration, the lower locking components (e.g., lower locking assembly 46) are rigidly linked with the upper locking components (e.g., upper locking assembly 48) in order to provide a high-force lock across all components. In view of this operation, the locking position is precise and repeatable. Other aspects of the summary of forces in the locked position are shown in FIG. 8. As described above, this combination of forces in conjunction with the configuration of tire inspection apparatus 10 results in precise alignment and repeatability.

Upon completing the test of the tire, steps are taken to unlock tire inspection apparatus 10. First, the tire is deflated and piston assembly 40 is re-actuated. As mentioned above, piston assembly 40 translates segments 72, 86 against spring assemblies 50 and intermediate springs 106. This provides sufficient clearance for locking balls 52 to move into unlock pockets 82, 100 formed within segments 72, 86 and assisted by tapered lower portion of through holes 117. Locking shaft 22 and upper tooling assembly 18 are thus free to be removed to an appropriate position for unloading the tire and subsequently repeating the measurement cycle.

Other details relative to suitable design and operation of a tire inspection apparatus which are not disclosed herein may be generally known to the person of ordinary skill in the art. For example, other aspects relative to suitable design and operation of a tire inspection apparatus may be disclosed in U.S. Pat. No. 5,257,561 and U.S. Publication No. 2017/0343453, which are incorporated herein by reference in that respect.

In light of the foregoing, it should be appreciated that the present invention advances the art by providing an improved tire inspection assembly. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A tire inspection assembly having a locked position and an unlocked position, the tire inspection assembly comprising
    a chuck assembly with an upper locking assembly and a lower locking assembly;
    an upper tooling assembly including
        a locking shaft with a shaft portion including a plurality of receptive grooves, a portion of the shaft portion being positioned in the chuck assembly in the locked position,
    where the plurality of receptive grooves are shaped as gothic arches;
    a first plurality of locking balls positioned between the upper locking assembly and a respective one of the plurality of receptive grooves, such that when in the locked position, the first plurality of locking balls have two points of contact with the respective one of the plurality of receptive grooves and one point of contact with the upper locking assembly;
    a second plurality of locking balls positioned between the lower locking assembly and another respective one of the plurality of receptive grooves, such that when in the locked position, the second plurality of locking balls have two points of contact with the another respective one of the plurality of receptive grooves and one point of contact with the lower locking assembly.

2. The tire inspection assembly of claim 1, the upper locking assembly being made up of a first plurality of segments, and the lower locking assembly being made up of a second plurality of segments, the first plurality of segments including from three to six segments, and the second plurality of segments including from three to six segments.

3. The tire inspection assembly of claim 2, further comprising a plurality of springs, each of the plurality of springs acting on a respective one of the first plurality of segments of the upper locking assembly, such that the locked position includes dual clamping from the first plurality of segments of the upper locking assembly and from the plurality of springs.

4. The tire inspection assembly of claim 3, further comprising a plurality of intermediate springs positioned between the upper locking assembly and the lower locking assembly, each of the plurality of intermediate springs acting on a respective one of the second plurality of segments of the lower locking assembly.

5. The tire inspection assembly of claim 1, further comprising a spindle assembly for housing and rotating a rotating shaft, and a rotary coupling positioned between the chuck assembly and the spindle assembly.

6. The tire inspection assembly of claim 5, further comprising a motor capable of driving the rotating shaft of the spindle assembly.

7. The tire inspection assembly of claim 5, the rotary coupling being devoid of ball bearings.

8. The tire inspection assembly of claim 5, further including a second rotary coupling positioned within the spindle assembly and around the rotating shaft.

9. The tire inspection assembly of claim 8, the second rotary coupling being devoid of ball bearings.

10. The tire inspection assembly of claim 1, wherein the first plurality of locking balls includes from six to twelve locking balls, and wherein the second plurality of locking balls includes from six to twelve locking balls.

11. The tire inspection assembly of claim 1, wherein the plurality of receptive grooves are shaped as gothic arches.

12. A tire inspection assembly having a locked position and an unlocked position, the tire inspection assembly comprising
    a chuck assembly with an upper locking assembly and a lower locking assembly,
        the upper locking assembly being a generally cylindrical sleeve divided into a first plurality of segments for applying a locking or clamping force to a first plurality of locking balls, the first plurality of segments including three or more segments,
        the lower locking assembly being a generally cylindrical sleeve divided into a second plurality of segments for applying a locking or clamping force to a second plurality of locking balls, and the second plurality of segments including three or more segments; and
    an upper tooling assembly including
        a locking shaft with a shaft portion, a portion of the shaft portion being positioned in the chuck assembly in the locked position.

13. A tire inspection assembly having a locked position and an unlocked position, the tire inspection assembly comprising
    a chuck assembly for locking an upper tooling assembly into the locked position;
    a spindle assembly for housing and rotating a rotating shaft; and
    a rotary coupling positioned between the chuck assembly and the spindle assembly, the rotary coupling including an air entry manifold for providing air as a pneumatic signal to a piston assembly, and the rotary coupling further including sealing elements for providing a pneumatic seal relative to the rotating shaft.

14. The tire inspection assembly of claim 13, further comprising an upper locking assembly being made up of a first plurality of segments, and a lower locking assembly being made up of a second plurality of segments.

15. A tire inspection assembly having a locked position and an unlocked position, the tire inspection assembly comprising
- a chuck assembly with an upper locking assembly and a lower locking assembly; the upper locking assembly being made up of a first plurality of segments, the lower locking assembly being made up of a second plurality of segments;
- an upper tooling assembly including
  - a locking shaft with a shaft portion including a plurality of receptive grooves, a portion of the shaft portion being positioned in the chuck assembly in the locked position,
- where the plurality of receptive grooves are shaped as gothic arches;
- a first plurality of locking balls positioned between the upper locking assembly and a respective one of the plurality of receptive grooves, such that when in the locked position, the first plurality of locking balls have two points of contact with the respective one of the plurality of receptive grooves and one point of contact with the upper locking assembly;
- a second plurality of locking balls positioned between the lower locking assembly and another respective one of the plurality of receptive grooves, such that when in the locked position, the second plurality of locking balls have two points of contact with the another respective one of the plurality of receptive grooves and one point of contact with the lower locking assembly;
- a spindle assembly for housing and rotating a rotating shaft; and
- a rotary coupling positioned between the chuck assembly and the spindle assembly.

16. The tire inspection assembly of claim 15, the rotary coupling being positioned external of the chuck assembly and the spindle assembly.

17. The tire inspection assembly of claim 16, the rotary coupling being coupled with the spindle assembly.

18. The tire inspection assembly of claim 15, the first plurality of segments including from three to six segments, and the second plurality of segments including from three to six segments.

19. The tire inspection assembly of claim 15, further comprising a plurality of springs, each of the plurality of springs acting on a respective one of the first plurality of segments of the upper locking assembly, such that the locked position includes dual clamping from the first plurality of segments of the upper locking assembly and from the plurality of springs, further comprising a plurality of intermediate springs positioned between the upper locking assembly and the lower locking assembly, each of the plurality of intermediate springs acting on a respective one of the second plurality of segments of the lower locking assembly.

20. The tire inspection assembly of claim 15, wherein the first plurality of locking balls includes from six to twelve locking balls, and wherein the second plurality of locking balls includes from six to twelve locking balls.

* * * * *